3,073,131
METHOD AND APPARATUS FOR RENDERING SALINE WATER POTABLE
Carlyle M. Ashley, Fayetteville, N.Y., assignor to Carrier Corporation, Syracuse, N.Y., a corporation of Delaware
Original application June 28, 1955, Ser. No. 518,431. Divided and this application Dec. 11, 1957, Ser. No. 702,205
2 Claims. (Cl. 62—58)

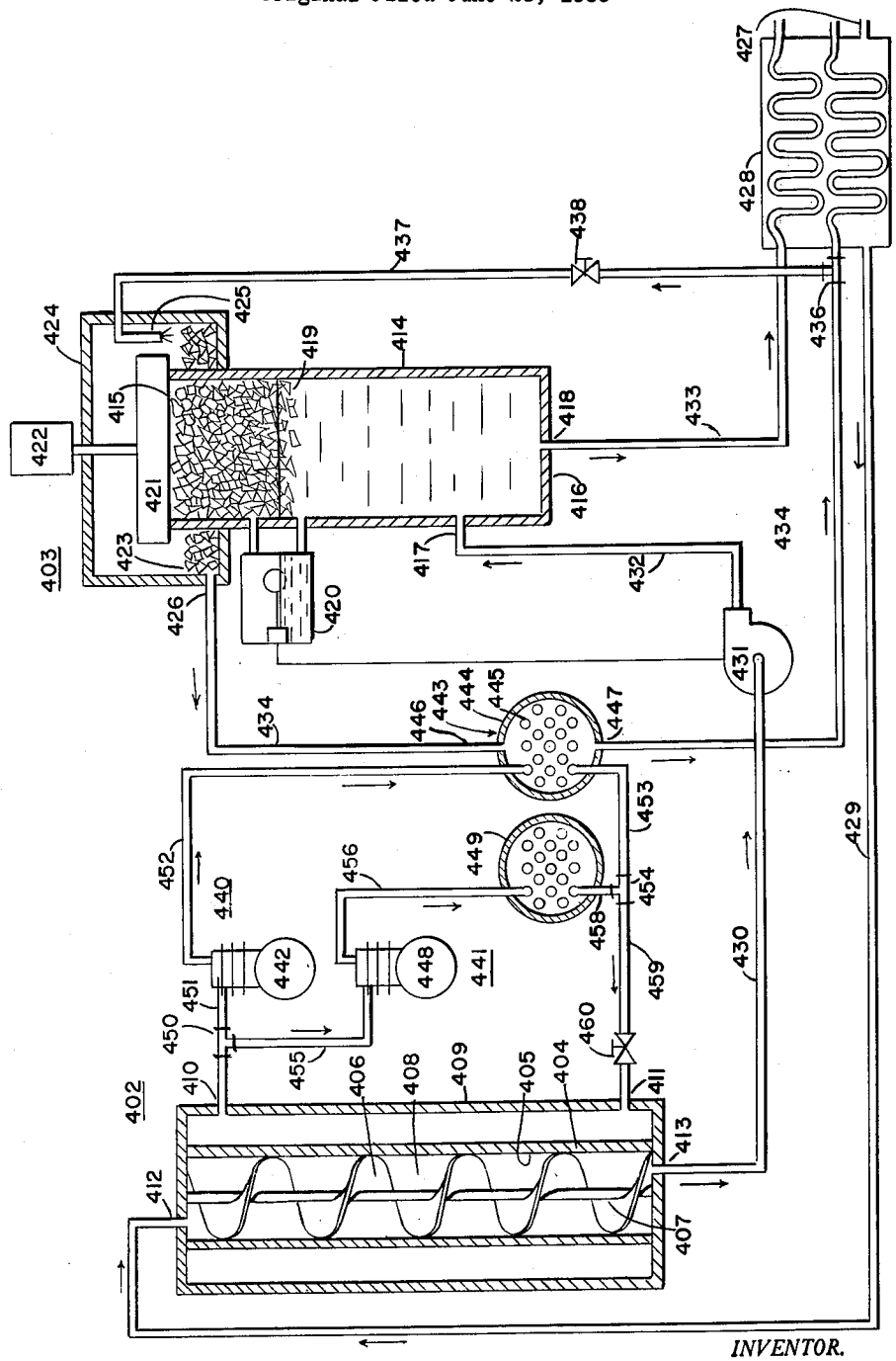

This application is a division of my copending application, Serial No. 518,431, filed June 28, 1955, and relates to a method and apparatus for rendering saline water potable and, more particularly, to a method and apparatus for converting sea water to potable water.

It is know that sea water may be purified by freezing. No commercially satisfactory system has heretofore been devised. Those systems which have been advanced either demand extravagant amounts of energy or else purify water inadequately. For example, prior centrifugal separation systems had failed for even the great centrifugal forces used were insufficient to overcome the tenacity with which the brine clings to the finely divided ice. Washing systems were unsuccessful because of the tremendous amount of fresh water which they required. These difficulties are more readily understandable when it is understood that the brine not only clings to the surface of the ice but also remains in the interstices between the ice crystals. This difficult situation is further aggravated by the need to reduce the impurity content of the water to less than 800 parts per million in order to render it potable.

The chief object of the present invention is to provide a method and apparatus for rendering saline water potable utilizing a freezing operation which obviates the disadvantages present in systems heretofore known.

An object of the present invention is to provide apparatus for converting a brine solution such as sea water to potable water which is highly efficient and effective in operation and which utilizes a freezing operation to concentrate or remove potable water from the solution.

A further object is to provide apparatus for forming and separating potable water from a brine solution such as sea water in which freezing means are employed to form ice from the brine solution, the ice being removed from the solution, further cleaned to remove brine and melted to provide potable water.

A still further object is to provide a method of forming potable water from a saline solution such as sea water. Other objects of the invention will be readily perceived from the following description.

This invention relates to a method of rendering saline water potable in which the steps consist in forming ice from a saline solution such as sea water thus creating a mixture of ice and sea water, separating the ice from the mixture, and melting a portion of the ice to wash the brine from the surface and interstices of the ice. The word "brine" is employed herein to denote salt in solution and in a crystalline form.

This invention further relates to a system for rendering saline water potable which comprises means for forming ice from a saline solution, means for separating the ice and the brine, and means for melting a portion of the ice to wash the brine from the surface and interstices of the formed ice.

The attached drawing illustrates a preferred embodiment of the invention.

Referring to the drawing there is shown a system which utilizes a freezing unit 402 and a separating and washing unit 403. In this embodiment the freezing unit forms ice in suspension and the separating and washing unit washes the ice by partially melting the ice thereby draining brine from the surfaces and interstices of the ice.

The freezing unit 402 comprises a vertical cylindrical shell 404 having an inner surface 405 in which is located a helical baffle 406 mounted on a filler shaft 407. The baffle and filler shaft are concentrically located within the vertical cylindrical shell to form with surface 405 a helical passageway 408 within the shell. The cylindrical shell is refrigerated by means of a jacket 409 placed about shell 404, forming with the wall of the shell a flooded evaporator. Liquid refrigerant is introduced into the evaporator through inlet 411 and the gaseous refrigerant is discharged from the evaporator through outlet 410.

The refrigerant for the evaporator is provided by a primary refrigeration system 440 and a secondary refrigeration system 441. The primary refrigeration system includes a compressor 442 and a condenser 443. The condenser 443 comprises a horizontal cylindrical shell 444, a tube bundle 445, a cooling water inlet 446 and a cooling water outlet 447. The secondary refrigeration system includes a compressor 448 and a condenser 449 of any suitable type depending upon the characteristics of the cooling medium utilized.

Refrigerant passes through the outlet 410 to the T 450 and through line 451 to the compressor 442 of the primary refrigeration system. Compressed refrigerant is forwarded through line 452 to condenser 443, passing through the tube bundle 445 and being condensed therein by potable water of a low temperature generated by the water purification system. The condensed liquid refrigerant is withdrawn from the tube bundle 445 through line 453 to the T 454. Simultaneously, gaseous refrigerant leaving the T 450 passes through line 455 to the compressor 448 of the secondary refrigeration system, the compressed gaseous refrigerant being forwarded through line 456 to the condenser 449. The gaseous refrigerant is condensed in the condenser, liquid refrigerant passing through line 458 and joins the line 453 at the T 454. The combined streams proceed through line 459 to the inlet 411 of the evaporator. A suitable valve 460 is located in the line 459 for the purpose of controlling refrigerant flow to the evaporator.

Located at the upper portion of the freezing unit 402 is a sea water inlet 412 through which sea water is introduced into the helican passageway 408. As the seal water passes through the passageway, it is refrigerated forming a mixture of ice and brine solution. As the brine solution carrying the ice moves along the passageway, the ice converges towards the center of the passageway while the brine solution remains close to the refrigerated inner surface 405. The ice and brine solution so formed is discharged from the freezing unit through outlet 413 located at the bottom of the cylindrical shell 404.

The separating and washing unit comprises a vertical cylindrical shell 414 having an open upper end 415 and a lower closed end 416. Located intermediate with these ends is an ice and brine solution inlet 417. The mixture of ice and brine solution introduced into the cylindrical shell separates due to forces of gravity, the heavier brine passing downwardly. Simultaneously, the lighter ice rises and later emerges from the brine solution. Level of brine solution in the unit is maintained above ice and brine solution inlet 417 by a brine level control 420 described hereafter.

Flush with the open end of the cylindrical shell 414 is located a slinger 421. Slinger 421 is driven by a motor 422. As ice emerges from the brine solution and then from the cylindrical shell, it is urged outwardly by the slinger 421 which throws the ice into a radial trough 423 which extends concentrically around the open end of the cylindrical shell 414. The outer walls of the trough are extended upwardly and over the trough and the open end of the shell thereby forming a hood 424. Nozzles 425 are placed in the hood above the trough. Potable water is sprayed through nozzles 425 to melt ice in trough 423. As the ice in the trough melts, the potable water passes from the separator section through the outlet 426.

In operation, sea water is introduced through line 427 into heat exchanger 428. The sea water in the heat exchanger is chilled to a degree near its freezing point. The sea water then passes through line 429 to the freezing unit 402. Sea water is introduced into the freezing unit 402 through inlet 412. The sea water passes into the helical passageway 408 and as it passes through the passageway, the sea water is refrigerated as it passes in heat exchange relation with refrigerant in the evaporator, forming a mixture of ice and brine solution. As ice forms at the cylindrical shell (the refrigerated surface), the rotary motion of the brine solution as it passes through the helical passageway causes the formed ice to converge or move toward the center of the passageway due to its lesser density. Simultaneously, as the ice moves from the refrigerated shell surface it is replaced by brine solution which has a greater density than the lighter ice. The ice formed is suspended in the brine solution and passes through the freezing unit without "caking" for, as the ice is formed, it is immediately carried away from the refrigerated surface.

The mixture of ice and brine solution so formed is withdrawn from the freezing unit through the discharge outlet 413 and line 430 by a pump 431. Pump 431 is operatively connected to the brine level control 420. The mixture of ice and brine solution is forwarded by pump 431 through line 432 to the combination separating and washing unit. The mixture of ice and brine solution is discharged through inlet 417 into the cylindrical shell 414. As the mixture of ice and brine solution enters the shell there is a natural separation in which the heavier brine falls to the bottom of the shell and is discharged through outlet 418. The discharged brine solution passes through line 433, and heat exchanger 428 and is discharged from the system. The brine solution is at a very low temperature; hence, it tends to chill the incoming sea water passing through the heat exchanger to the freezing unit.

Simultaneously, as the brine solution falls downwardly in the cylindrical shell 414, the lighter ice passes upwardly towards the brine solution level 419. This brine solution level is maintained well below the open end 415 of the vertical shell. The desired level is maintained by control 420 operatively connected to the pump 431 to regulate the amount of ice and brine solution pumped into the vertical shell 414.

As the mixture of ice and brine solution continues to be discharged into the vertical shell, the ice, because of the buoyant forces created by the heavier brine solution, tends to emerge above the brine solution level. Preferably, temperature in hood 424 is so selected that partial melting of the ice occurs. The water so formed creates a washing effect to wash the brine from the surface and interstices of the ice.

It is understood that the ice which has emerged from the surface of the brine solution is continually moving upwardly until the ice contacts slinger 421. The rotary motion of the slinger moves the ice outwardly away from the open end of the shell. The ice falls into the trough 423. Simultaneously, warm water is discharged through the nozzles 425 causing the ice to melt and to drain through the outlet 426. The water formed from the melted ice passes through line 434, through the condenser 443 where the refrigerant is cooled and is then forwarded by a pump (not shown) through the heat exchanger 428 where it is again utilized to chill incoming sea water. The potable water is then collected at a place of use or storage. In line 434, there is a T 436, line 437 being connected thereto. Line 437 supplies water to the nozzles 425 of the washing and melting unit. A control valve 438 is placed in line 437 to regulate the amount of water recirculated.

It should be noted that nozzles 425 have a twofold purpose. One function is to provide potable water to melt the ice collected in trough 422; its second function is to maintain temperature in the hood 424 at a point such that ice formed in the shell will melt partially to provide washing of the ice as it emerges from the brine solution.

The present invention has been described with particular reference to the formation of potable water from sea water. It will be understood the structure and method of the invention may be applied to the concentration of fruit juices, purification of water, etc., with only slight adaptations in the present equipment and described methods.

While I have described a preferred embodiment of the invention, it will be understood the invention is not limited thereto since it may be otherwise embodied within the scope of the following claims:

I claim:

1. In a system for rendering a saline solution potable, the combination of a freezing vessel section; a separator vessel operatively connected thereto; said freezing section including an inner cylindrical refrigerated surface, a helical baffle, and a concentric filler shaft, said baffle and shaft being arranged to provide a helical path within said freezing section to impart centrifugal forces to the brine solution as it passes through the freezing section whereby a mixture of ice and brine solution is formed; said separator including a vessel, a level control and a trough, said control maintaining a desired brine solution level in said vessel to permit ice to separate from remaining brine solution by forces of buoyancy, said separator having means for partially melting said ice to wash solute from the surface and interstices of the ice, and means for transferring the ice from said separator vessel to the trough.

2. In a method for rendering a saline solution potable the steps which consist of passing the saline solution into a helical passageway enveloped by a refrigerated cylindrical surface, forming ice adjacent the cylindrical surface, centrifugally displacing the less dense ice with saline solution adjacent the refrigerated surface, passing the ice into the center of the stream passing through the helical passageway, passing the mixture of ice and saline solution into a separation tank, settling the more dense concentrated saline solution in the bottom of the settling tank, passing the less dense ice and saline solution into the upper portion of the settling tank, passing the ice above the level of the saline solution in the settling tank, melting a portion of the ice above the level of the saline solution to wash the brine from the surface and interstices of the ice.

References Cited in the file of this patent

UNITED STATES PATENTS

| | | |
|---|---|---|
| Re. 24,038 | Arnold | July 19, 1955 |
| 1,738,275 | Baker | Dec. 3, 1929 |
| 1,931,347 | Gay | Oct. 17, 1933 |
| 2,101,053 | Oman | Dec. 14, 1937 |
| 2,241,726 | Krause | May 13, 1941 |
| 2,259,841 | Spiegl | Oct. 21, 1941 |
| 2,315,762 | Ax et al. | Apr. 6, 1943 |
| 2,503,695 | Webb | Apr. 11, 1950 |
| 2,597,515 | Nitsch | May 20, 1952 |
| 2,613,513 | Shields | Oct. 14, 1952 |
| 2,705,407 | Colonna | Apr. 5, 1955 |
| 2,764,488 | Slattery | Sept. 25, 1956 |